United States Patent
Law, Jr. et al.

(10) Patent No.: US 6,370,654 B1
(45) Date of Patent: Apr. 9, 2002

(54) METHOD AND APPARATUS TO EXTEND THE FAULT-TOLERANT ABILITIES OF A NODE INTO A NETWORK

(75) Inventors: Albert G. Law, Jr.; Jay Woods, both of Plano; Peter M. Willenbring, Richardson, all of TX (US)

(73) Assignee: Northern Telecom Limited, Montreal (CA)

( * ) Notice: Subject to any disclaimer, the term of this patent is extended or adjusted under 35 U.S.C. 154(b) by 0 days.

(21) Appl. No.: 09/213,682

(22) Filed: Dec. 17, 1998

(51) Int. Cl.[7] .............................. G06F 11/00
(52) U.S. Cl. ........................................ 714/4
(58) Field of Search .................... 714/4, 18, 11

(56) References Cited

U.S. PATENT DOCUMENTS

| | | | |
|---|---|---|---|
| 5,384,783 A | * | 1/1995 | Satomi .......................... 714/4 |
| 5,764,920 A | * | 6/1998 | Cook ........................... 709/238 |
| 6,185,695 B1 | * | 2/2001 | Murphy .......................... 714/4 |
| 6,205,557 B1 | * | 3/2001 | Chong ........................... 714/4 |

* cited by examiner

Primary Examiner—Robert Beausoleil
Assistant Examiner—Bryce P. Bonzo
(74) Attorney, Agent, or Firm—Haynes and Boone, LLP

(57) ABSTRACT

An apparatus that networks fault-tolerant computing platforms with non fault-tolerant computing platforms includes at least one fault-tolerant computing platform, a plurality of non fault-tolerant computing platforms, and communication links connecting the fault-tolerant computing platform to the non fault-tolerant computing platforms. The fault-tolerant computing platform includes application software and a fault-tolerant extension layer. Each non fault-tolerant computing platform includes application software and a fault-tolerant extension layer. A method for extending fault-tolerance into the non fault-tolerant computing platforms includes the steps of: a) waiting for a transaction from the application software; c) selecting a non fault-tolerant computing platform; d) sending the transaction to a first non fault-tolerant computing platform; e) if a response from the first non fault-tolerant computing platform is not received within a preset time period, then sending the transaction, bundled with an associated BLOB, to a second non fault-tolerant computing platform; and f) if a response from the non fault-tolerant computing platform is received within a preset time period, then storing any BLOB received with the response.

7 Claims, 5 Drawing Sheets

METHOD AND APPARATUS TO EXTEND THE FAULT-TOLERANT ABILITIES OF A NODE INTO A NETWORK

TECHNICAL FIELD

This invention relates to computer networks, and in particular to a network of many telephone switches, which are special cases of general purpose computers.

BACKGROUND OF THE INVENTION

Traditionally a telephony switch is a single large fault-tolerant node. A telephony network is made up of many of these switches, with duplicate connections between nodes.

Switch manufacturers have traditionally put fault-tolerance in their products. Because the number of switches sold is relatively small, the expense per switch is high.

Switch manufacturers also have traditionally kept their switch software proprietary. Often custom software tools are used to create the switch software. These factors contribute to delays in getting new services into a telephony network.

A common approach to solving these two problems is to attempt to move the complex parts of the software to an off-switch computer platform that takes advantage of the performance increases in common off-the-shelf processors, and development capabilities of new software technologies. However, telephony network providers still require the network to have high reliability. Engineers looking to move complexity off-switch therefore have to solve the problem of fault-tolerance.

Existing methodologies involve replicating the software components on multiple hardware platforms. One method has two identical software components, on separate hardware platforms, handling incoming messages but only one sending the outgoing response. Another method has a backup copy of the software component on a separate hardware platform, and the active component updates the data in the standby copy when it sends a response. These methods require resources on multiple hardware platforms even when no failure conditions occur.

What is needed is a method that will allow fault-tolerant computing platforms to network with non fault-tolerant computing platforms.

SUMMARY OF THE INVENTION

The present invention solves these problems by providing a method of fault-tolerance by extending the capabilities of a fault-tolerant computing platform to networked, non fault-tolerant computing platforms.

The apparatus of the present invention networks fault-tolerant computing platforms with non fault-tolerant computing platforms. The apparatus comprises at least one fault-tolerant computing platform, a plurality of non fault-tolerant computing platforms, and communication links connecting the fault-tolerant computing platform to the non fault-tolerant computing platforms. The fault-tolerant computing platform includes application software and a fault-tolerant extension layer. Each non fault-tolerant computing platform includes application software and a fault-tolerant extension layer.

In another feature of the invention, the non fault-tolerant computing platform is a general purpose computing platform, the fault-tolerant computing platform is a telephone switch, and the application software is call processing software.

The method of the present invention, for extending fault-tolerance with non fault-tolerant computing platforms, by means of the fault-tolerant extension layer, includes the steps of: a) waiting for a transaction from the application software; c) selecting a non fault-tolerant computing platform; d) sending the transaction to a first non fault-tolerant computing platform; e) if a response from the first non fault-tolerant computing platform is not received within a preset time period, then sending the transaction, bundled with an associated BLOB, to a second non fault-tolerant computing platform; and f) if a response from the non fault-tolerant computing platform is received within a preset time period, then storing any BLOB received with the response.

DESCRIPTION OF THE PREFERRED EMBODIMENT

Figure 1:
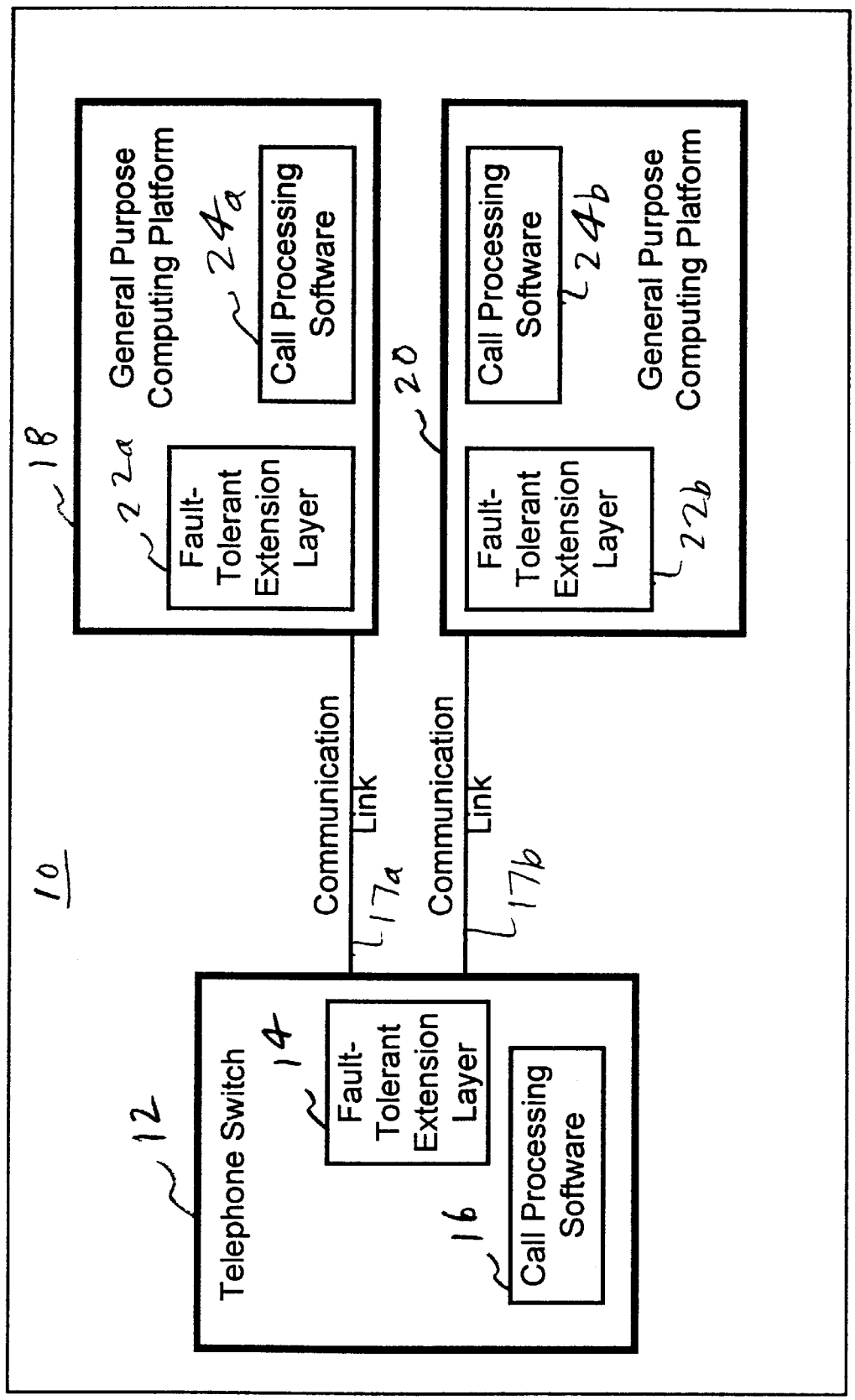
FIG. 1 is a block diagram of the system of the present invention, as used with telephone switches.

Referring now to FIG. 1, a system 10 according to the present invention includes a telephone switch 12. The telephone switch 12 includes a fault-tolerant extension layer 14 and call processing software 16. The telephone switch 12 connects by communication links 17 to many general purpose computing platforms 18 and 20, but only two are shown, by way of example. The general purpose computing platforms 18 and 20 are non fault-tolerant computing platforms.

Each of the general purpose computing platforms 18 and 20 include a fault-tolerant extension layer 22a, 22b and call processing software 24a, 24b.

In operation, when the telephone switch 12 sends a call transaction off-switch for processing, the general purpose computing platform 18 performs any necessary operations. Upon completion of processing, the general purpose computing platform 18 is required to send a response back to the switch within a certain amount of time. When the general purpose computing platform 18 is ready to send the response, the fault-tolerant extension layer 22a captures a representation of the call and attaches it as a Binary Large Object (BLOB). The telephone switch 12 uses the response to determine that no failures occurred. Then the telephone switch 12 stores the BLOB with other data associated with the call, and releases any previous BLOB stored for that call.

When another event occurs on that call, the event is passed off-switch to the general purpose computing platform 18. If a failure is detected (by the timer expiring), the telephone switch 12 selects the general purpose computing platform 20, and sends the BLOB associated with the call and the event that occurred. The general purpose computing platform 20 takes the BLOB and recreates the call and then processes the transaction. Upon completion of processing, the general purpose computing platform 20 captures a new representation of the call, and attaches it as a BLOB to the response.

The method of the present invention allows the system 10 to support true N+1 redundancy (of the non fault-tolerant computing platforms 18 and 20), and only one of the non fault-tolerant computing platforms needs to perform any processing, unless a failure occurs.

The method of the present invention is particularly advantageous for telephony, because telephone switching networks are already built around fault-tolerant computing platforms, which are expensive. Although call processing services are growing more complex, which in turn requires more CPU power, general purpose computing platforms are relatively inexpensive. Call processing services are often modeled as state machines which are typically easy to store as BLOBs and re-create.

Figure 2:
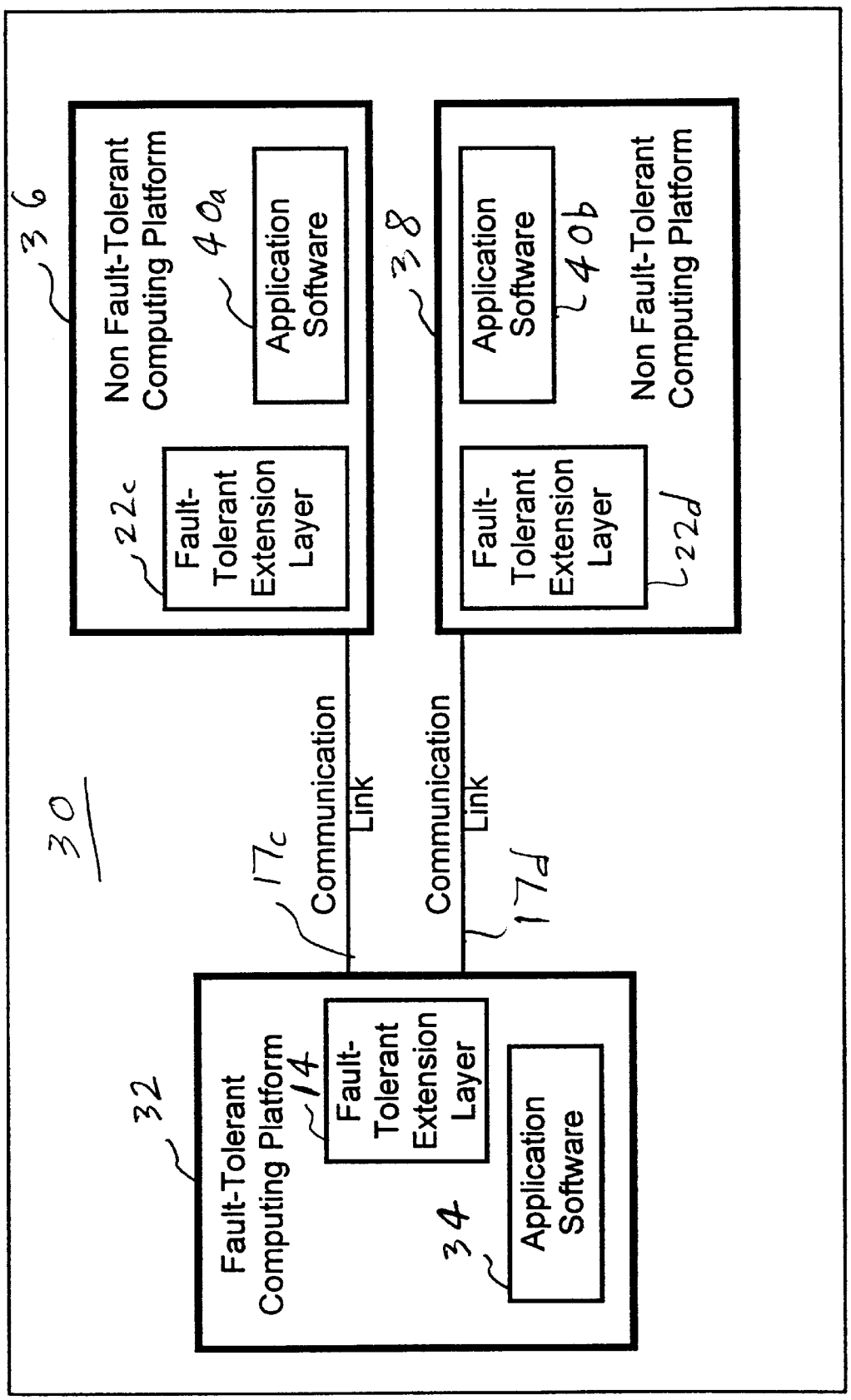
FIG. 2 is a block diagram of the system of the present invention, as used with a network of computers.

The method of the preferred embodiment is not limited to telephony. Rather, the method can be used in any network of computers. Referring now to FIG. 2, which illustrates this broader application, a system 30 includes a fault-tolerant computing platform 32. The fault-tolerant computing platform 32 includes a fault-tolerant extension layer 14 and application software 34. The system 30 connects by communication links 17 to many non fault-tolerant computing platforms 36 and 38, but only two are shown, by way of example.

Each of the non fault-tolerant computing platforms 36 and 38 include a fault-tolerant extension layer 22c, 22d, and application software 40a, 40b.

Figure 3A:
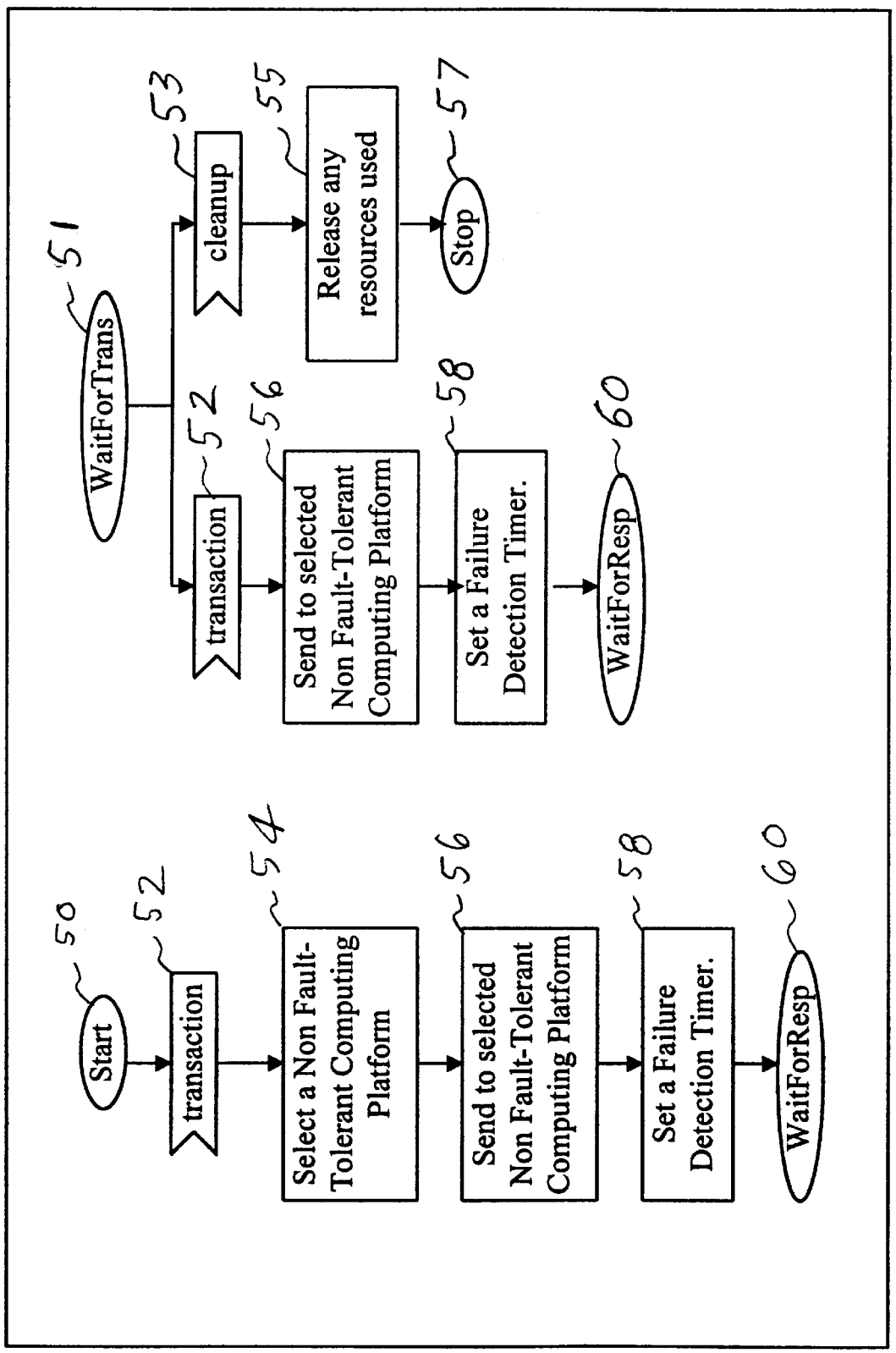
FIGS. 3A and 3B are flow charts illustrating the method of the present invention, as implemented by the fault-tolerant extension layer in a fault-tolerant computing platform.
Figure 3B:
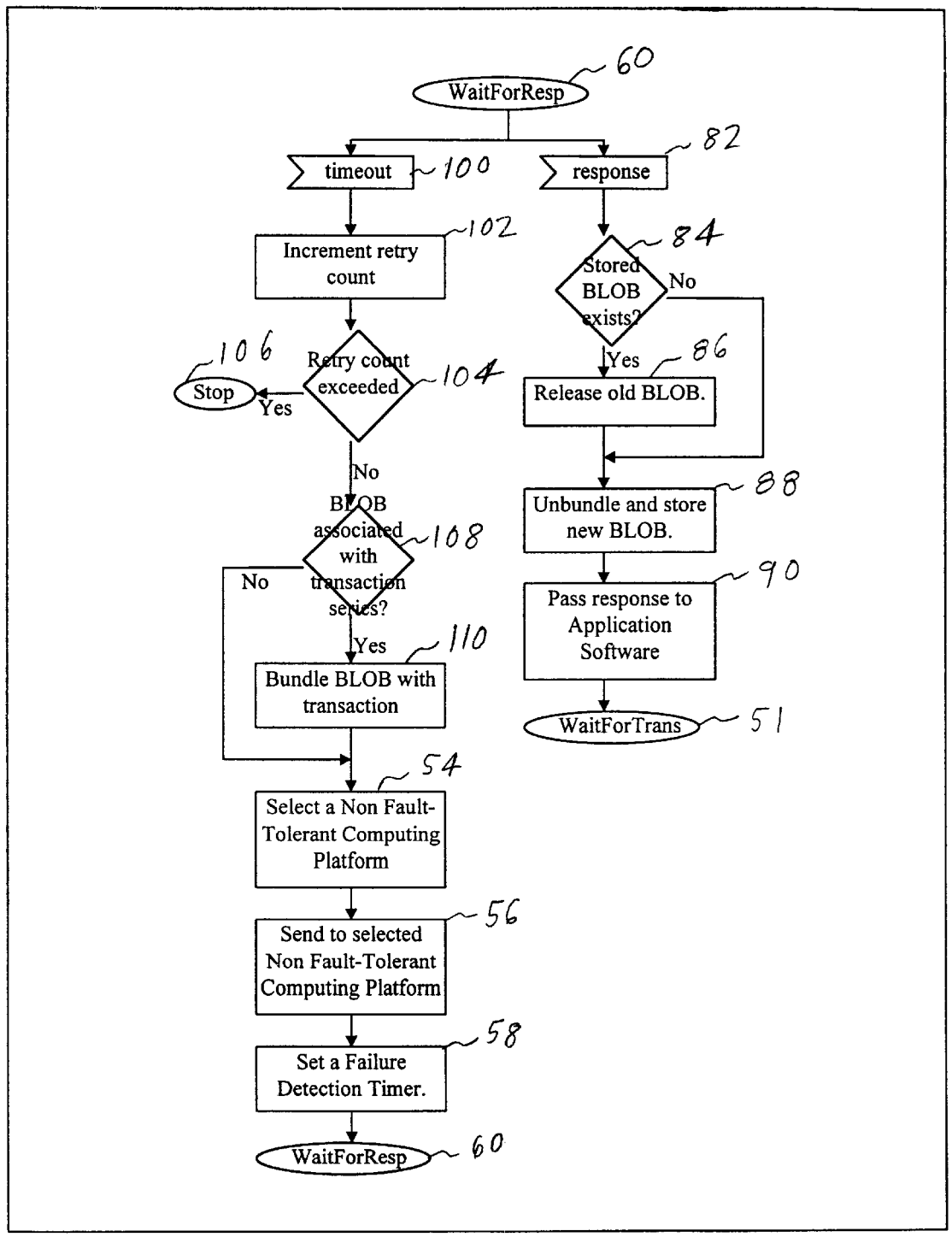

Referring now to FIGS. 3A and 3B, which is the fault-tolerant extension layer 14, in step 52 the fault-tolerant computing platform 32 identifies a transaction that can use a non fault-tolerant computing platform. In step 54, the fault-tolerant extension layer 14 selects one of the non fault-tolerant computing platforms 36 and 38 (in this case 36). In step 56 the fault-tolerant extension layer 14 sends the transaction to the non fault-tolerant computing platform 36 via the communication link 17c. In step 58 the fault-tolerant extension layer 14 sets a timer to detect failures. In step 60 the fault-tolerant extension layer 14 waits for a response from the fault-tolerant extension layer 22c. The non fault-tolerant computing platform 36 is required to send a response back to the fault-tolerant computing platform 32 before the timer expires. This allows the fault-tolerant computing platform 32 to identify failures regardless of cause (hardware failure, communications loss, software abort, etc.).

Referring now to FIG. 3B, in step 60 the fault-tolerant extension layer 14 waits for a response from the fault-tolerant extension layer 22c. If, in step 82, it receives a response, then it cancels the timer associated with that transaction. In step 84, the fault-tolerant extension layer 14 queries whether a stored BLOB exists. If a stored BLOB exists, then in step 86 the fault-tolerant extension layer 14 releases any old BLOB, and in step 88 unbundles the new BLOB and stores it. If a stored BLOB does not exist, then the fault-tolerant extension layer 14 proceeds directly to step 88. In step 90, the fault-tolerant extension layer 14 passes the response to the application software 34, and then in step 51 waits for a transaction.

Referring now back to step 60, the fault-tolerant extension layer 14 waits for a response from the fault-tolerant extension layer 22c. If, in step 100, the fault-tolerant extension layer 14 receives a timeout, then in step 102 the fault-tolerant extension layer 14 increment the retry count. In step 104 the fault-tolerant extension layer 14 checks to see if the retry count is exceeded. If it is exceeded, then in step 106, fault-tolerant extension layer 14 stops the process.

If the retry count is not exceeded, then in step 108 the fault-tolerant extension layer 14 queries whether a BLOB is associated with the transaction series. If there is a BLOB, then in step 110 the fault-tolerant extension layer 14 bundles the BLOB with the transaction, and proceeds to steps 54 through 60, described above.

Referring back to FIG. 3A, in step 51 the fault-tolerant extension layer 14 waits for a transaction request. If it receives a transaction request, then it proceeds with steps 52 through 60, described above. If, in step 53, fault-tolerant extension layer 14 receives a cleanup request, then in step 55 it releases any resources used, and in step 57 stops processing.

When a new transaction (related to the earlier transaction) is identified by the fault-tolerant computing platform 32, the fault-tolerant extension layer 14 sends the new transaction to the same non fault-tolerant computing platform 36 as the earlier transaction. The fault-tolerant computing platform 32 sets a timer to detect failures. If the non fault-tolerant computing platform 36 fails to respond before the timer expires, failure actions are taken. The fault-tolerant extension layer 14 takes a copy of the BLOB associated with the earlier transaction, bundles it with the new transaction, and selects a different non fault-tolerant computing platform, such as the non fault-tolerant computing platform 38. The fault-tolerant extension layer 14 sends the bundle to the the non fault-tolerant computing platform 38 via the communication link 17d.

Upon receipt of the transaction bundled with the BLOB, the fault-tolerant extension layer 22d removes the BLOB, and uses it to re-create the status in the application software 40b. Then the new transaction is passed to the application software 40b. It completes processing and passes a response to the fault-tolerant extension layer 22d. The fault-tolerant extension layer 22d gathers a BLOB, bundles it with the response, and sends it back to the fault-tolerant computing platform 32 via the communications link 17d. Then the the fault-tolerant extension layer 14 repeats its earlier response processing.

Figure 4:
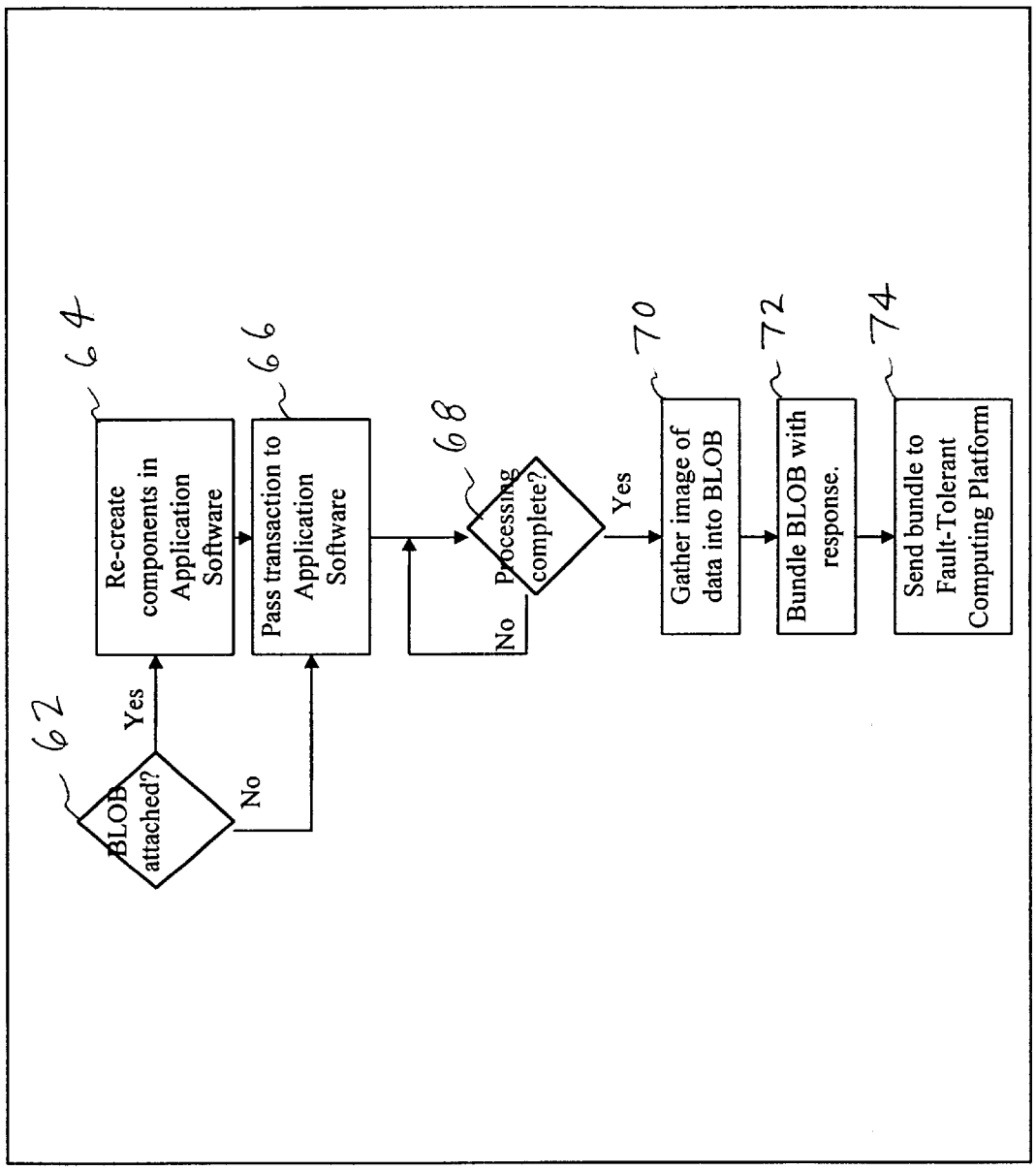
FIG. 4 is a flow chart illustrating the method of the present invention, as implemented by the fault-tolerant extension layer in a non fault-tolerant computing platform.

Referring now to FIG. 4, which is the fault-tolerant extension layer 22, of the non fault-tolerant computing platform 36, in step 62 the fault-tolerant extension layer 22c receives the transaction, and queries whether a BLOB is attached. If a BLOB is attached, then in step 64 the fault-tolerant extension layer 22c first recreates components in the application software 40a, and then in step 66 passes the transaction to the application software 40a. If a BLOB is not attached, then the fault-tolerant extension layer 22c merely passes the transaction to the application software 40a.

In step 68, the fault-tolerant extension layer 22c determines whether the application software 40a has finished processing the transaction, that is, produced a response. If it has produced a response, then in step 70 the fault-tolerant extension layer 22c gathers an image of all the data stored in the application software 40a (a BLOB). In step 72 the fault-tolerant extension layer 22c bundles the BLOB with the response, and in step 74 sends it via the communications link 17c back to the fault-tolerant computing platform 32.

In an alternate embodiment, the hardware of the non fault-tolerant computing platform 36 is different from the hardware of the non fault-tolerant computing platform 38, and the application software 40a and 40b each have the identical functionality. In another alternate embodiment, the fault-tolerant extension layers 14 and 22 implement data compression to reduce the bandwidth requirement of the communication links 17. The method of the present invention can be used for purposes other than failure recovery. For example, the fault-tolerant computing platform 32 can balance the workload of the non fault-tolerant computing platforms 36 and 38.

What is claimed is:

1. In an system comprising a fault tolerant computing platform, non fault-tolerant computing platforms, and application software, a method for extending fault-tolerance into the non fault-tolerant computing platforms, comprising the steps of:

a. waiting for a transaction from the application software;
   b. selecting a non fault-tolerant computing platform;
   c. sending the transaction to the non fault-tolerant computing platform;
   d. if a response from the first non fault-tolerant computing platform is not received within a preset time period, then sending the transaction, bundled with an associated BLOB, to a second non fault-tolerant computing platform; and
   e. if a response from the non fault-tolerant computing platform is received within a preset time period, then storing any BLOB received with the response.

2. The method of claim 1 wherein when a response is received, if a stored BLOB exists, then releasing the old BLOB, and unbundling and storing the new BLOB.

3. The method of claim 1 further comprising the step of passing the response to the application software.

4. The method of claim 1 further comprising, after the step of sending the transaction to a first non fault-tolerant computing platform, the step of setting a failure-detection timer.

5. The method of claim 1 wherein the non fault-tolerant computing platforms comprise general purpose computing platforms.

6. The method of claim 5 wherein the fault-tolerant computing platform comprises a telephone switch.

7. The method of claim 6 wherein the application software is call processing software.

* * * * *